United States Patent
Mizutani

(10) Patent No.: US 7,855,355 B2
(45) Date of Patent: Dec. 21, 2010

(54) HIGH-VOLTAGE POWER UNIT AND MASS SPECTROMETER USING THE POWER UNIT

(75) Inventor: Shiro Mizutani, Uji (JP)

(73) Assignee: Shimadzu Corporation, Kyoto (JP)

( * ) Notice: Subject to any disclaimer, the term of this patent is extended or adjusted under 35 U.S.C. 154(b) by 290 days.

(21) Appl. No.: 12/066,028

(22) PCT Filed: Sep. 8, 2005

(86) PCT No.: PCT/JP2005/016526

§ 371 (c)(1),
(2), (4) Date: Mar. 6, 2008

(87) PCT Pub. No.: WO2007/029327

PCT Pub. Date: Mar. 15, 2007

(65) Prior Publication Data

US 2009/0230297 A1      Sep. 17, 2009

(51) Int. Cl.
*B01D 59/44* (2006.01)
*H01J 49/00* (2006.01)
(52) U.S. Cl. ............ 250/281; 250/282; 250/283; 250/285; 250/292
(58) Field of Classification Search ......... 250/281–283, 250/285, 292
See application file for complete search history.

(56) References Cited

U.S. PATENT DOCUMENTS

| 5,621,630 A | 4/1997 | Suzuki et al. |
| 5,773,822 A | 6/1998 | Kitamura et al. |
| 6,002,600 A | 12/1999 | Scapellati |
| 6,927,985 B2 * | 8/2005 | Klinkowstein ............... 363/17 |
| 2003/0112297 A1 * | 6/2003 | Hiratsuka et al. ............. 347/58 |

FOREIGN PATENT DOCUMENTS

| JP | 06-168796 A | 6/1994 |
| JP | 07-168403 A | 7/1995 |
| JP | 09-153339 A | 6/1997 |
| JP | 2004-342462 A | 12/2004 |

* cited by examiner

*Primary Examiner*—Jack I Berman
*Assistant Examiner*—Meenakshi S Sahu
(74) *Attorney, Agent, or Firm*—Sughrue Mion, PLLC

(57) ABSTRACT

The output terminal P2 of the positive voltage generating circuit 2 and the output terminal Q1 of the negative voltage generating circuit 4 are connected in series. The output terminal Q2 of the negative voltage generating circuit 4 is connected to the ground via the resistor 10. Each of the resistors 6 and 7 is respectively connected in parallel to the voltage generating circuits 2 and 4. A high voltage whose polarity is changed is taken from the output terminal P1 of the positive voltage generating circuit 2. For changing the output voltage from positive to negative one, the control circuit 1 controls each of the drive circuits 3 and 5 so that the output of the positive voltage generating circuit 2 changes from the voltage +HV to zero and the output of the negative voltage generating circuit 4 simultaneously changes from zero to –HV. Accordingly, the output voltage changes in a short period of time. Although a high-voltage-resistance resistor is required in this configuration, it is far more inexpensive and has higher reliability compared to a high-voltage relay or a semiconductor switch which has been conventionally used.

12 Claims, 3 Drawing Sheets

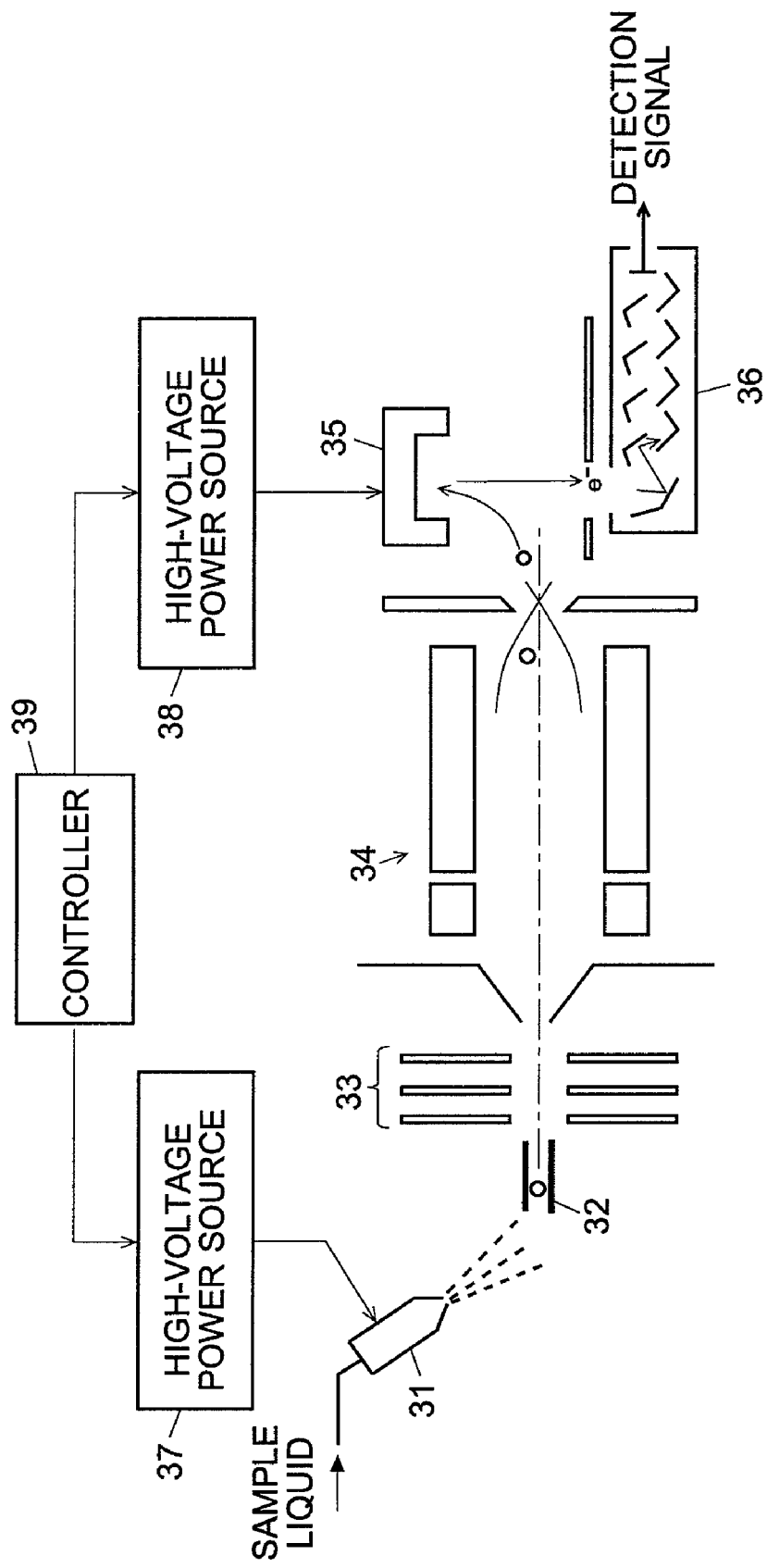

HIGH-VOLTAGE POWER UNIT AND MASS SPECTROMETER USING THE POWER UNIT

TECHNICAL FIELD

The present invention relates to a high-voltage power unit capable of switching the polarity of an output voltage between positive and negative, and to a mass spectrometer using such a power unit.

BACKGROUND ART

Conventionally, ion detectors including a conversion dynode and a secondary-electron multiplier have been used for detecting ions with high sensitivity in a mass spectrometer. In such an ion detector, a high voltage (up to approximately ±10 kV for example) having a polarity opposite to that of the ions to be analyzed is required to be applied to a conversion dynode for selectively detecting positive ions and negative ions. In a liquid chromatograph mass spectrometer, an ion source provided by an electrospray ionization (ESI) method is used for example for vaporizing and simultaneously ionizing a liquid sample. In such an ion source, a high voltage (approximately ± several kV for example) with a polarity equal to that of the ions to be analyzed is required to be applied to the tip of a nozzle for spraying a liquid sample.

In such a use as described earlier, the polarity of the high voltage applied is required to be changed corresponding to whether the object to be analyzed is a positive ion or a negative ion. Therefore, a high-voltage power unit capable of switching the polarity of an output voltage of single system is used. One of the most conventionally well-known high-voltage power units for switching high voltages of different polarity is one using a high-voltage reed relay (See Patent Document 1 for example.).

In a high-voltage power unit with such a configuration, when changing a relay, spike discharges may occur to break the relay. Therefore, when switching the polarity of an output voltage, it is necessary to observe the following procedure: decrease the output voltage, actuate the relay to change the contacts when the output voltage becomes adequately small, and after that, increase the output voltage. Consequently, it takes some time to change the polarity, which elongates the non-detection period. This affects the accuracy of an analysis in the case where, for example, the detection of the positive ions and negative ions are alternately performed by switching them within a short period of time in a mass spectrometer. In addition, a high-voltage relay of 10 kV or above is generally expensive but nonetheless does not have a very long life time. That is, it is costly and also has a problem in reliability.

On the other hand, a high-voltage semiconductor switch (e.g. power MOSFET or the like) might be used in place of a reed switch. The switching operation of a semiconductor switch itself is much faster than that of a relay. However, although a high-voltage semiconductor switch of 10 kV or above is available, it is highly expensive. Even in cases where relatively-inexpensive semiconductor switches are used, since they have to be connected in series in multiple stages, the cost eventually becomes significantly high. And a semiconductor switch also has a problem in reliability since it is weak in the discharge of a high voltage.

[Patent Document 1] U.S. Pat. No. 6,002,600 (refer to FIG. 1C)

DISCLOSURE OF THE INVENTION

Problem to be Solved by the Invention

The present invention is achieved to solve the previously-described problem, and the objective thereof is to provide a high-voltage power unit capable of reducing the cost more than before with high reliability and also capable of relatively-quickly changing the polarity of an output voltage, and to provide a mass spectrometer using such a power unit.

Means for Solving the Problems

To solve the previously-described problem, the present invention provides a high-voltage power unit capable of selectively providing a high voltage of positive or negative polarity, including:

a positive voltage generating circuit for generating a positive high voltage;

a negative voltage generating circuit for generating a negative high voltage;

a control circuit for controlling each of the positive high voltage generated by the positive voltage generating circuit and the negative high voltage generated by the negative voltage generating circuit;

a first resistor connected in parallel to an output side of the positive voltage generating circuit; and a second resistor connected in parallel to an output side of the negative voltage generating circuit, wherein:

one output terminal of the positive voltage generating circuit and one output terminal of the negative voltage generating circuit are connected to connect the two voltage generating circuits in series connection; and one of two terminals of the series connection is used as a reference side and a high-voltage output whose polarity is changed is taken out from the other terminal.

As one exemplary embodiment of the high-voltage power unit according to the present invention, each of the positive voltage generating circuit and the negative voltage generating circuit includes a booster transformer, and a rectifier circuit using a Cockcroft-Walton circuit connected to a secondary winding of the transformer.

Effect of the Invention

In a high-voltage power unit according to the preset invention, in order to switch the positive and negative high voltages, there is no need for using high-voltage reed relays or semiconductor switches as in a conventional manner; only a high-voltage-resistance resistor is added and connected in parallel on the output side of each voltage generating circuits. Therefore, a significant cost reduction can be achieved. In addition, a discharge accompanying the switching does not occur, and the breakage of an element thereby does not take place. Even in the case where a spike noise or the like are included in the high-voltage output for some reason, a breakage does not easily occur, unlike a semiconductor switch or the like. Accordingly, a high reliability can be assured for a long period of time.

In the high-voltage power unit according to the present invention, the controller controls the positive voltage generating circuit and the negative voltage generating circuit, when switching the polarity of the high-voltage output between positive and negative, so that when an output voltage of either one of the voltage generating circuits changes from a first predetermined voltage to zero, an output voltage of the other voltage generating circuit simultaneously changes from zero to a second predetermined voltage.

That is, there is no need to decrease the output voltage of one side and then increase the output voltage of the other side in changing the polarity. The control as described earlier can bring about a rapid polarity change.

The high-voltage power unit according to the present invention may further include a voltage-dividing resistor for dividing the high-voltage output, wherein a detected voltage by the voltage-dividing resistor is sent back to the control circuit as a feedback, and the control circuit refers to the detected voltage to control the positive voltage generating circuit and/or the negative voltage generating circuit.

With this configuration, it is possible to make the voltage value of a high-voltage output converge to a target voltage with a high degree of accuracy by a closed feedback loop. Hence, the voltage value of a high-voltage output will stay stable even in the case where some sort of disturbance, i.e. load fluctuation, occurs.

The high-voltage power unit as described earlier can be used for various purposes and applied to various apparatuses; for example, a mass spectrometer. Specifically, for example, the high-voltage output by the high-voltage power unit may be used in an ion source and/or an ion detector. In this case, the polarity of the high-voltage output by the high-voltage power unit may be switched corresponding to the polarity of an ion to be analyzed.

Since the high-voltage power unit according to the present invention can quickly change the polarity as stated earlier, it is possible to shorten the non-detection period in which both positive and negative ions cannot be detected, and the detection failure can be therefore decreased in the case where, for example, it is necessary to alternately perform the positive ion's detection and the negative ion's detection every short period of time.

BRIEF DESCRIPTION OF THE DRAWINGS

FIG. 5 is a schematic configuration diagram of a mass spectrometer using the high-voltage power unit of the present embodiment.

BEST MODE FOR CARRYING OUT THE INVENTION

Figure 1:
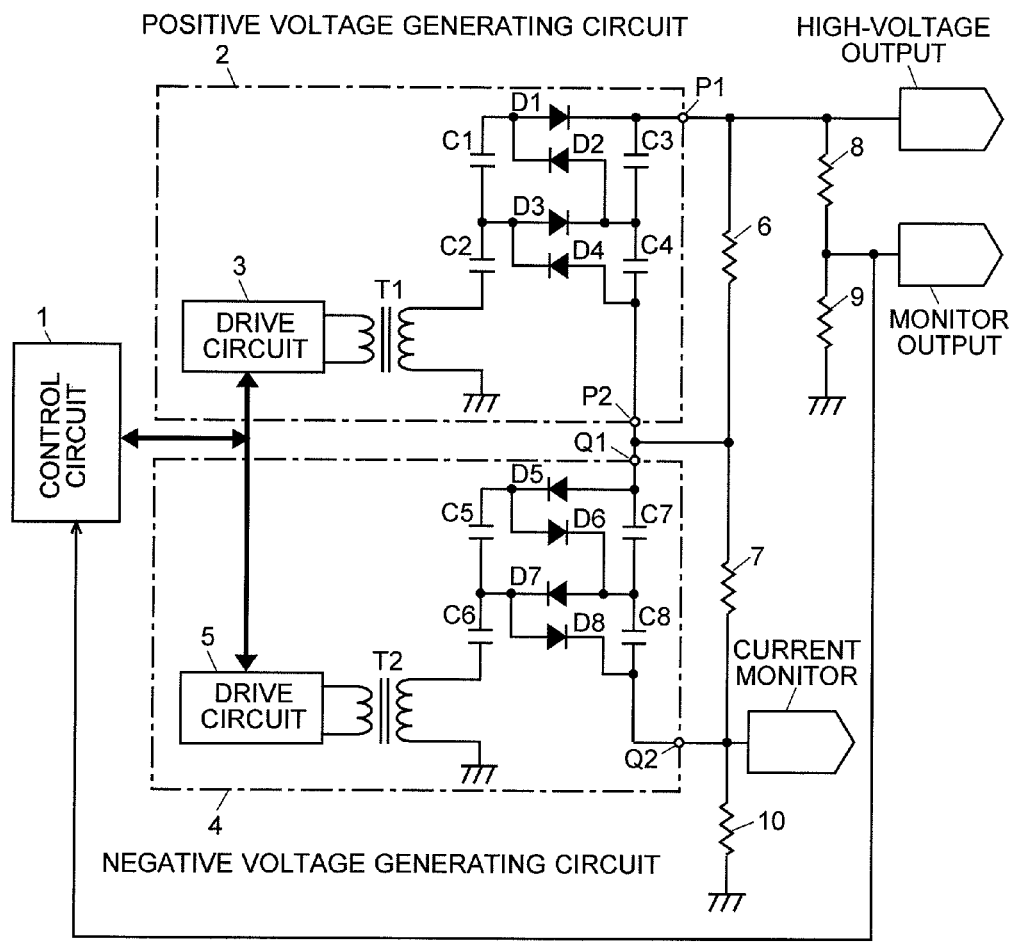
FIG. 1 is a configuration diagram of the main portion of a high-voltage power unit according to an embodiment of the present invention.

Hereinafter, one embodiment of a high-voltage power unit according to the present embodiment will be described in detail in reference to FIGS. 1 through 4. FIG. 1 is a configuration diagram of the main portion of the high-voltage power unit according to the present embodiment.

This high-voltage power unit provides a positive or negative DC high voltage of approximately a few to 10 kV and includes a positive voltage generating circuit 2, a negative voltage generating circuit 4, and a control circuit 1 for controlling the drive circuits 3 and 5 included in the voltage generating circuits 2 and 4. The positive voltage generating circuit 2 and the negative voltage generating circuit 4 basically have the same configuration. For example, the positive voltage generating circuit 2 includes a transformer T1 as a booster, a drive circuit 3 for driving the primary winding of the transformer T1, and a rectifier circuit (voltage quadrupler rectifier circuit) using a Cockcroft-Walton circuit composed of four capacitors C1 through C4 and four diodes D1 through D4 connected to the secondary winding of the transformer T1. In the negative voltage generator 4, the direction of each of the diodes D5 through D8 in the Cockcroft-Walton circuit is opposite to that in the positive voltage generator 2.

The output terminal P2 of the positive voltage generating circuit 2 and the output terminal Q1 of the negative voltage generating circuit 4 are connected. The other output terminal Q2 of the negative voltage generating circuit 4 is connected to the ground (reference zero potential) via a resistor 10. This resistor 10 is placed only for the current monitor, and the operation of this circuit is basically the same as in the case where the resistor 10 is shunted. Hence, the output terminal Q2 corresponds to the reference side in the present invention. Between the output terminals P1 and P2 of the positive voltage generating circuit 2, a resistor 6 which corresponds to the first resistor of the present invention is connected in parallel, and between the output terminals Q1 and Q2 of the negative voltage generating circuit 4, another resistor 7 which corresponds to the second resistor of the present invention is connected in parallel. That is, the resistors 6 and 7 also have the form of a series connection. And, a high-voltage output is taken out from the resistor 6's terminal that is on the other side of the node between the resistors 6 and 7, i.e. from the output terminal P1 of the positive voltage generating circuit 2. A resistor 8 and a resistor 9 are connected in series between the high-voltage output terminal and the ground. And from a node between the resistors 8 and 9, a monitor output is taken out, which is provided to the control circuit 1 as a feedback.

Figure 2:
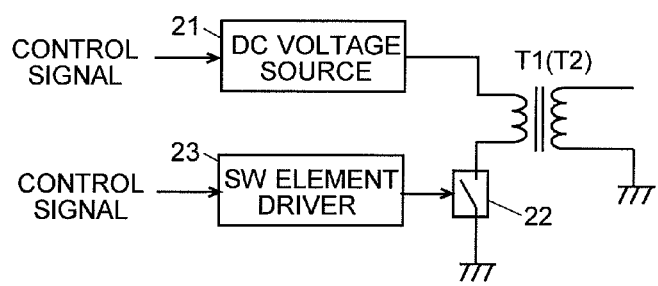
FIG. 2 is a detail configuration diagram of the drive circuit in FIG. 1.

FIG. 2 illustrates the interior configuration of the drive circuits 3 and 5. In the drive circuits 3 and 5, a DC voltage is applied to a primary winding of the transformer T1 by the DC voltage source 21. This application voltage (or a supply current) is turned on/off by a switching element 22 connected in series to the primary winding. The switching element 22 is switched on/off by a control signal supplied by the switching (SW) element driver 23. When the pulse width of a rectangular wave signal generated in the SW element driver 23 changes, the effectual electric power supplied to the primary winding of the transformer T1 changes. Accordingly, it is possible to change the output voltage of the positive voltage generating circuit 2 and the negative voltage generating circuit 4. Alternatively, the application voltage itself of the DC voltage source 21 may be changed with a control signal; the effective electric power supplied to the primary winding of the transformer T1 is accordingly changed, and consequently the output voltage of the positive voltage generating circuit 2 and the negative voltage generating circuit 4 is changed.

Figure 3:
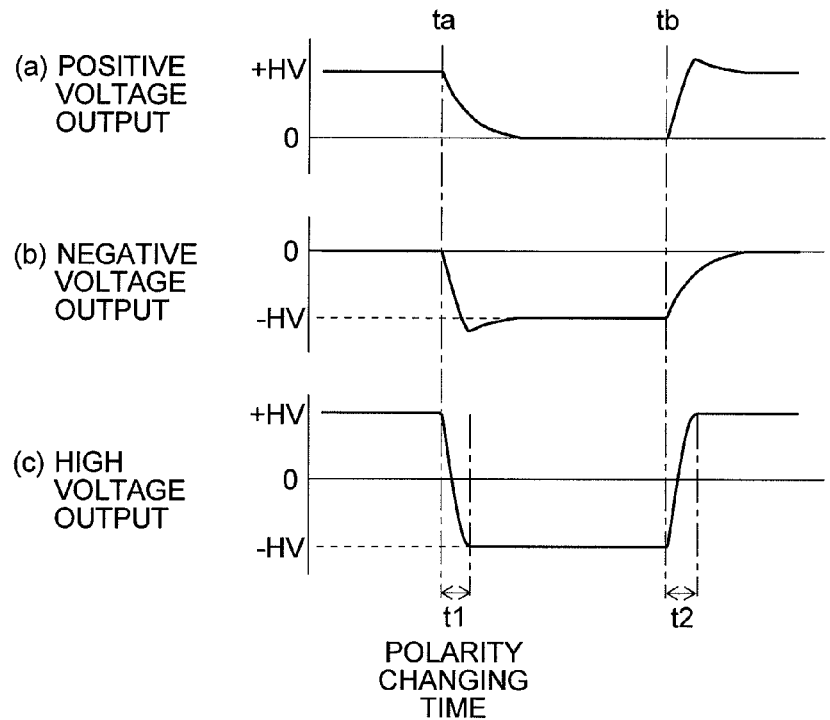
FIG. 3 is a waveform diagram illustrating the states when the polarity is changed in the high-voltage power unit of the present embodiment.
Figure 4:
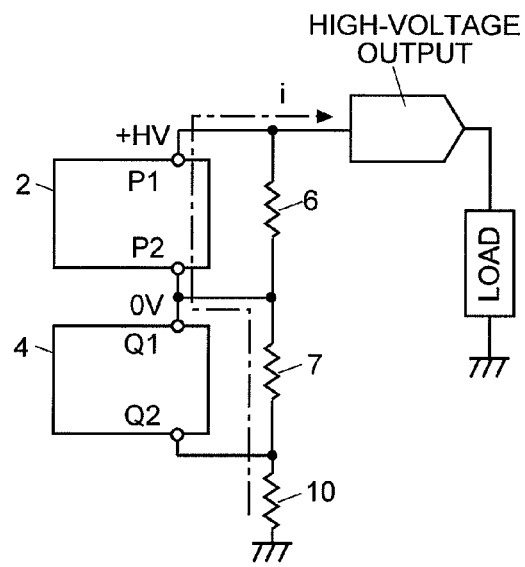
FIG. 4 is a schematic diagram illustrating the current flow in the high-voltage power unit of the present embodiment.
Figure 4:
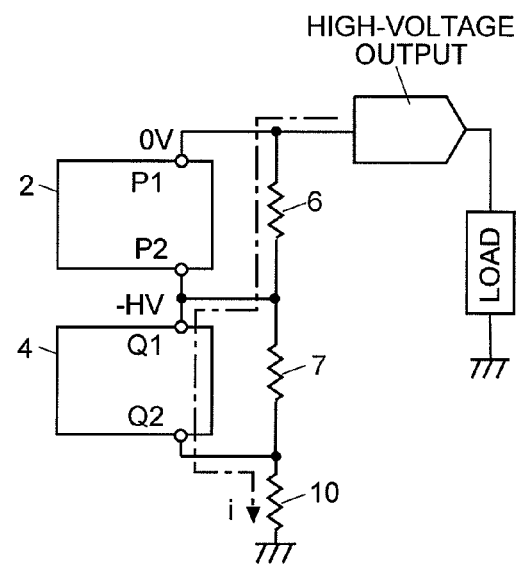

An operation of the high-voltage power unit according to the present embodiment when switching the polarity of the voltage provided from the high-voltage output terminal will be described in reference to FIGS. 3 and 4. FIG. 3 is a waveform diagram illustrating the states when the polarity is switched, and FIG. 4 is a schematic diagram illustrating the current flow in the circuit.

When a positive voltage +HV is provided to the high-voltage output terminal, a voltage is intermittently applied to the primary winding of the transformer T1 in the positive voltage generating circuit 2 under the control of the control circuit 1, which makes the output voltage of the positive voltage generating circuit 2 +HV. On the other hand, no voltage is applied to the primary winding of the transformer T2 of the negative voltage generating circuit 4, hence the output voltage of the negative voltage generating circuit 4 is 0. In this case, as illustrated in FIG. 4(*a*), a current i flows from the ground through the resistor 10, the resistor 7, and the positive voltage generating circuit 2, and is consequently supplied to a load connected to the high-voltage output terminal. Since the resistor 7 is connected in parallel to the negative voltage generating circuit 4, the current pathway as described earlier can be formed. Since a voltage value corresponding to the voltage +HV appearing in the high-voltage output terminal is provided to the control circuit 1 as a feedback, the control circuit 1 compares this voltage value with a target value, and changes the control signal for the SW element driver 23 in the positive voltage generating circuit 2 or changes the application voltage of the DC voltage source 21 in order to reduce the error. Accordingly, it is possible to precisely set the output voltage +HV to any target voltage.

When the output of the high-voltage output terminal is changed from the positive voltage +HV to the negative voltage −HV, the control circuit 1 stops applying a voltage to the primary winding of the transformer T1 in the positive voltage generating circuit 2, and at the same time, sends a control signal to the drive circuits 3 and 5 so that a voltage is started to be intermittently applied to the primary winding of the transformer T2 in the negative voltage generating circuit 4. This control change can be simultaneously performed, for example, at the precision of the time ta in FIG. 3. Based on such a control change, an application voltage to the primary winding of transformers T1 and T2 immediately changes; however, since a capacitor in the rectifier circuit is required to be charged or discharged, the output of each of the voltage generating circuits 2 and 4 gradually changes. As illustrated in FIGS. 3(*a*) and (*b*), the positive voltage gradually decreases from +HV to zero, and in contrast, the negative voltage gradually increases from zero to converge on −HV after a slight overshoot (to negative voltages).

The voltage appearing on the high-voltage output terminal has a waveform in which the positive voltage and the negative voltage as described earlier are added. Therefore, it changes from the positive voltage +HV to the negative voltage −HV in a short changing time t1 as illustrated in FIG. 3(*c*). With a conventional configuration using a reed relay, the changing time is fairly long since it is necessary to increase the negative voltage after the positive voltage has decreased to zero. Contrary to this, the configuration of the present embodiment can dramatically shorten the changing time. Specifically, for example, although it takes approximately 400 ms for the changing time in a conventional configuration, it takes 10-20 ms for the changing time with the configuration of the present embodiment.

When a negative voltage is provided to the high-voltage output terminal, as illustrated in FIG. 4(*b*), a current flowing through the load connected to the high-voltage output terminal flows into the ground via the resistor 6, the negative voltage generating circuit 4, and the resistor 10. Since the resistor 6 is connected in parallel to the positive voltage generating circuit 2, the current pathway as described earlier can be formed. Since a voltage value corresponding to the voltage −HV appearing in the high-voltage output terminal is provided to the control circuit 1 as a feedback even in this case as a matter of course, the control circuit 1 compares this voltage value with a target value, and changes the control signal for the SW element driver 23 in the negative voltage generating circuit 4 or changes the application voltage of the DC voltage source 21 in order to reduce the error. Accordingly, it is possible to precisely set the output voltage −HV to any target voltage.

The operation for changing the output of the high-voltage output terminal from the negative voltage −HV to the positive voltage +HV is basically the same, as described earlier, as in the case where the output is changed from the positive voltage +HV to the negative voltage −HV. Therefore, the changing time is very short.

With the configuration of the high-voltage power unit according to the present embodiment, a discharge or the like does not take place when changing the voltage as previously described. Therefore, a breakage or failure may not occur unlike in the case where a semiconductor switch is used, and a high reliability can be maintained. In addition, since a high-voltage-resistance resistor is far more inexpensive compared to a high-voltage reed switch or a semiconductor switch, it also has a great advantage in cost.

In the previously-described configuration, the resistance value of the resistors 6 and 7 which are connected in parallel to the voltage generating circuits 2 and 4 is important. Because, if the resistance value is too high, the voltage drop in the resistors 6 and 7 in the states illustrated in FIGS. 4(*a*) and (*b*) becomes large, and the power loss in a steady state accordingly becomes large. On the other hand, if this resistance value is too small, the proportion of the current flowing into the resistors 6 or 7 in the current that should primarily flow into the load rises, which also leads to a power loss. Therefore, it is desirable to properly set the resistance value of the resistors 6 and 7 by the voltage value of a high-voltage output, the load's condition, etc. When a high voltage of 10 kV is provided, for instance, each resistance value of the resistors 6 and 7 may be set to approximately 50 MΩ. The resistance value of the resistor 8 as a divider is required to be large: it may be set to 1 GΩ for example.

FIG. 5 illustrates an example of a schematic configuration of a mass spectrometer using the high-voltage power unit according to the present embodiment. This mass spectrometer is used for analyzing a sample liquid eluted from a liquid chromatograph for example. The sample liquid is sprayed into an atmosphere of approximate atmospheric pressure from the nozzle 31 for an electrospray. This ionizes sample atoms and molecules included in the sample liquid. In this process, high voltages (normally several kV) with different polarities according to the polarity of the ions to be generated are required to be applied to the tip of the nozzle 31. As a voltage source therefor, the high-voltage power unit 37 of a polarity changing type as described earlier can be used.

The ions generated by the aforementioned ionization are sent to a subsequent stage through a desolvation pipe 32, and are converged by an ion lens 33 driven by a voltage source, which is not illustrated, to be introduced into a space across the long axis of a quadrupole filter 34. A voltage in which an RF voltage and a DC voltage are superposed is applied to the quadrupole filter 34 by the voltage source which is not illustrated. And by the electric field formed by the voltage, only ions having a predetermined mass number pass through the quadrupole filter 34. A high voltage (normally, approximately 10 kV) with a polarity opposite to that of the ions to be analyzed is applied to a conversion dynode 35 in the further subsequent stage by a high-voltage power unit 38 of a polarity changing type as previously described. The ions induced by the electric field by the high voltage touch the conversion dynode 35 to beat out secondary electrons. The secondary electrons emitted fly downward and reach a secondary electron multiplier 36. They are multiplied inside the secondary electron multiplier 36, and a detection signal corresponding to the number of the secondary electrons that flew in first, i.e. the number of the ions that reach the conversion dynode 35, is taken out.

That is, in the mass spectrometer with the previously-described configuration, the controller 39 sends control signals for switching to each of the high-voltage power units 37 and 38 in accordance with the polarity of the ions to be analyzed. Since the polarity changing in the high-voltage power units 37 and 38 can be quickly performed as described earlier, even in the case where, for example, the positive ions' detection and negative ions' detection are repeatedly performed alternately every short period of time, the time in which ion detection cannot be performed is shortened; accordingly, fine mass chromatograms and total ion chromatograms can be created.

It is apparent that FIG. 5 is an example of a simplified configuration and the previously-described high-voltage power unit of a polarity changing type may be used in a part other than that described earlier.

The configurations of the high-voltage power unit described in the previously-described embodiments is merely an example of the present invention, and it is clear that any modifications, additions and adjustment to be made appropriately within the scope of the present invention are also included in the scope of the claims of the present application.

The invention claimed is:

1. A high-voltage power unit capable of selectively providing a high voltage of positive or negative polarity, comprising:
   a positive voltage generating circuit with two output terminals for generating a positive high voltage;
   a negative voltage generating circuit with two output terminals for generating a negative high voltage;
   a control circuit for controlling each of the positive high voltage generated by the positive voltage generating circuit and the negative high voltage generated by the negative voltage generating circuit;
   a first resistor connected between the two output terminals of the positive voltage generating circuit in parallel to an output side of the positive voltage generating circuit; and
   a second resistor connected between the two output terminals of the negative voltage generating circuit in parallel to an output side of the negative voltage generating circuit,
   wherein:
   one output terminal of the positive voltage generating circuit and one output terminal of the negative voltage generating circuit are connected to connect the two voltage generating circuits in a series connection;
   one of two terminals of the series connection is used as a reference side, and a high-voltage output whose polarity is changed is taken out from the other terminal; and
   the first resistor and the second resistor are connected in a series connection.

2. The high-voltage power unit according to claim 1, wherein each of the positive voltage generating circuit and the negative voltage generating circuit includes a booster transformer, and a rectifier circuit using a Cockcroft-Walton circuit connected to a secondary winding of the transformer.

3. The high-voltage power unit according to claim 1, wherein the controller controls the positive voltage generating circuit and the negative voltage generating circuit, when switching a polarity of the high-voltage output between positive and negative, so that when an output voltage of either one of the voltage generating circuits changes from a first predetermined voltage to zero, an output voltage of the other voltage generating circuit simultaneously changes from zero to a second predetermined voltage.

4. The high-voltage power unit according to claim 1, further comprising a voltage-dividing resistor for dividing the high-voltage output, wherein a detected voltage by the voltage-dividing resistor is sent back to the control circuit as a feedback, and the control circuit refers to the detected voltage to control the positive voltage generating circuit and/or the negative voltage generating circuit.

5. A mass spectrometer using the high-voltage output by the high-voltage power unit according to claim 1 in an ion source and/or an ion detector, wherein a polarity of a high-voltage output by the high-voltage power unit is switched corresponding to a polarity of an ion to be analyzed.

6. The high-voltage power unit according to claim 2, wherein the controller controls the positive voltage generating circuit and the negative voltage generating circuit, when switching a polarity of the high-voltage output between positive and negative, so that when an output voltage of either one of the voltage generating circuits changes from a first predetermined voltage to zero, an output voltage of the other voltage generating circuit simultaneously changes from zero to a second predetermined voltage.

7. The high-voltage power unit according to claim 2, further comprising a voltage-dividing resistor for dividing the high-voltage output, wherein a detected voltage by the voltage-dividing resistor is sent back to the control circuit as a feedback, and the control circuit refers to the detected voltage to control the positive voltage generating circuit and/or the negative voltage generating circuit.

8. The high-voltage power unit according to claim 3, further comprising a voltage-dividing resistor for dividing the high-voltage output, wherein a detected voltage by the voltage-dividing resistor is sent back to the control circuit as a feedback, and the control circuit refers to the detected voltage to control the positive voltage generating circuit and/or the negative voltage generating circuit.

9. A mass spectrometer using the high-voltage output by the high-voltage power unit according to claim 2 in an ion source and/or an ion detector, wherein a polarity of a high-voltage output by the high-voltage power unit is switched corresponding to a polarity of an ion to be analyzed.

10. A mass spectrometer using the high-voltage output by the high-voltage power unit according to claim 3 in an ion source and/or an ion detector, wherein a polarity of a high-voltage output by the high-voltage power unit is switched corresponding to a polarity of an ion to be analyzed.

11. A mass spectrometer using the high-voltage output by the high-voltage power unit according to claim 4 in an ion source and/or an ion detector, wherein a polarity of a high-voltage output by the high-voltage power unit is switched corresponding to a polarity of an ion to be analyzed.

12. The high-voltage power unit according to claim 1, wherein the controller controls the positive voltage generating circuit and the negative voltage generating circuit, so that when an output voltage of either one of the voltage generating circuits changes from a first predetermined voltage to zero, an output voltage of the other voltage generating circuit simultaneously changes from zero and converge on a second predetermined voltage after overshoot.

* * * * *